United States Patent
Fisher et al.

(10) Patent No.: US 8,452,630 B1
(45) Date of Patent: May 28, 2013

(54) METHOD AND SYSTEM FOR SCHEDULING WORKERS

(75) Inventors: Andrea Eve Fisher, Tucson, AZ (US); Brandee Lyn Crawford, Tucson, AZ (US); Jonathan Louis Amos, Tucson, AZ (US)

(73) Assignee: Intuit Inc., Mountain View, CA (US)

( * ) Notice: Subject to any disclaimer, the term of this patent is extended or adjusted under 35 U.S.C. 154(b) by 637 days.

(21) Appl. No.: 12/358,991

(22) Filed: Jan. 23, 2009

(51) Int. Cl.
*G06Q 10/00* (2012.01)
(52) U.S. Cl.
USPC ............................................ 705/7.16
(58) Field of Classification Search
USPC ............................................ 705/7.16
See application file for complete search history.

(56) References Cited

U.S. PATENT DOCUMENTS

| | | | |
|---|---|---|---|
| 2004/0024789 A1* | 2/2004 | Ditcharo et al. | 707/200 |
| 2004/0078257 A1* | 4/2004 | Schweitzer et al. | 705/9 |
| 2004/0193473 A1* | 9/2004 | Robertson et al. | 705/9 |
| 2004/0267591 A1* | 12/2004 | Hedlund et al. | 705/9 |
| 2005/0004828 A1* | 1/2005 | deSilva et al. | 705/9 |
| 2007/0179829 A1* | 8/2007 | Laperi et al. | 705/9 |
| 2008/0059277 A1* | 3/2008 | Medina et al. | 705/9 |

OTHER PUBLICATIONS

Cantwell, Rebecca, "U S West, Workers Face Off Union Employees Stop Work After Company Tells Them to Remove Protest Armbands," Denver Rocky Mountain News, Denver, Colo., Oct. 22, 1998, p. 1.B.*
Champion-Hughes, Ruth, "Totally Integrated Employee Benefits," Public Personnel Management, Fall, 2001, pp. 287-302.*
Miller, Christopher S., Whitehead, Steven J., and Clark-Morrison, Elizabeth, "On-Call Policies Help Avoid Overtime Pay," HRMagazine, Alexandria, Jul. 1996, vol. 41, Iss. 7, p. 57.*
Kasavana, Michael L., "Labor Scheduling Software for Clubs," Club Management, 82, 2, Apr. 2003, pp. 63-64 and 66-69.*

* cited by examiner

*Primary Examiner* — Nathan Erb
(74) *Attorney, Agent, or Firm* — Osha Liang LLP

(57) ABSTRACT

A method for scheduling workers in a business day. The method includes obtaining a scheduled worker distribution specifying an amount of work to be performed by the workers during a business day, where each worker is assigned a schedule within a work window, which includes a core component and a flex component. The method further includes obtaining a forecasted demand distribution for an amount of work to be performed by the workers during the business day and comparing the scheduled worker distribution with the forecasted demand distribution for the business day. The method further includes creating a new schedule for a worker when the scheduled worker distribution and the forecasted demand distribution are not substantially equal, where the new schedule is within the work window associated with the worker, and notifying, a predetermined amount of time in advance of the business day, the worker of the new schedule.

20 Claims, 6 Drawing Sheets

| Period Start | Week 1 | Week 2 | Week 3 | Week 4 |
|---|---|---|---|---|
| 5:00 AM | 2 | 3 | 1 | 3 |
| 5:30 AM | 2 | 3 | 2 | 2 |
| 6:00 AM | 2 | 3 | 2 | 2 |
| 6:30 AM | 3 | 3 | 2 | 4 |
| 7:00 AM | 3 | 3 | 2 | 5 |
| 7:30 AM | 3 | 3 | 2 | 4 |
| 8:00 AM | 3 | 3 | 2 | 3 |
| 8:30 AM | 4 | 5 | 2 | 2 |
| 9:00 AM | 4 | 5 | 3 | 2 |
| 9:30 AM | 4 | 5 | 3 | 3 |
| 10:00 AM | 4 | 4 | 3 | 4 |
| 10:30 AM | 4 | 4 | 3 | 3 |
| 11:00 AM | 4 | 7 | 4 | 3 |
| 11:30 AM | 4 | 7 | 4 | 3 |
| 12:00 PM | 4 | 7 | 4 | 3 |
| 12:30 PM | 4 | 7 | 4 | 3 |
| 1:00 PM | 4 | 7 | 4 | 3 |
| 1:30 PM | 4 | 7 | 4 | 4 |
| 2:00 PM | 4 | 8 | 3 | 5 |
| 2:30 PM | 4 | 8 | 3 | 3 |
| 3:00 PM | 4 | 7 | 3 | 3 |
| 3:30 PM | 4 | 7 | 3 | 3 |
| 4:00 PM | 4 | 6 | 3 | 2 |
| 4:30 PM | 3 | 6 | 3 | 1 |
| 5:00 PM | 3 | 6 | 3 | 1 |
| 5:30 PM | 3 | 5 | 3 | 2 |
| 6:00 PM | 3 | 5 | 3 | 3 |
| 6:30 PM | 3 | 5 | 3 | 4 |
| 7:00 PM | 3 | 4 | 3 | 4 |
| 7:30 PM | 3 | 4 | 2 | 2 |
| 8:00 PM | 2 | 4 | 2 | 1 |
| 8:30 PM | 2 | 3 | 2 | 1 |
| 9:00 PM | 0 | 0 | 0 | 0 |
| 9:30 PM | 0 | 0 | 0 | 0 |

FIG. 5

METHOD AND SYSTEM FOR SCHEDULING WORKERS

BACKGROUND

Many businesses have customer needs that are not consistent throughout a week or month or some other period of time. For example, a number of retail businesses have a much higher volume of customers during the holiday shopping season (e.g., Christmas, Thanksgiving, Kwanza, etc.) than they do at other times of the year. Similarly, accounting firms and other businesses associated with income tax returns have a very high amount of customer demand between late January and mid April than they do for the remainder of the year.

At times such as these, a business must balance the need to satisfy its customers by providing good service with the need to keep its employees happy. Oftentimes, companies tend to focus on satisfying the customer, and as a result, the employees have to make a number of significant sacrifices, such as being subjected to inconsistent work schedules. Inconsistent work schedules can range from working inconsistent shifts on the same days of a business week to not having the same days off every week to having to work long hours on certain days or weeks. In addition, notification to changes to a work schedule in these circumstances are often made at the last minute.

When employees are exposed to these conditions, they are less satisfied with their job, which can lead to poor customer service or, in cases where jobs are relatively easy to find, a high employment turnover rate. Poor customer service can lead to a decrease in business and damage to company reputation and goodwill. A high turnover rate can lead to increased costs in training new employees to replace those that are leaving at a more frequent rate. Being able to schedule workers more effectively can lead to higher employee satisfaction, which in turn can lead to, among other things, higher customer satisfaction, lower employee turnover, and increased job satisfaction among employees.

SUMMARY

In general, in one aspect, the invention relates to a method for scheduling a number of workers in a business day. The method includes obtaining a scheduled worker distribution specifying an amount of work to be performed by the number of workers during each increment of time during the business day, where at least one worker of the number of workers is assigned one of a number of schedules within one of a number of work windows, and where each of the number of work windows includes a core component and a flex component. The method further includes obtaining a forecasted demand distribution for an amount of work to be performed by the number of workers during each increment of time during the business day and comparing the scheduled worker distribution with the forecasted demand distribution for the business day. The method further includes creating a new schedule for one or more workers when the scheduled worker distribution and the forecasted demand distribution are not substantially equal, where the new schedule is within the work window associated with the worker. The method further includes notifying, a predetermined amount of time in advance of the business day, the worker of the new schedule.

In general, in one aspect, the invention relates to a computer readable medium including instructions executable by a computer to perform method steps for scheduling a number of workers in a business day. The instructions including functionality to obtain a scheduled worker distribution specifying an amount of work to be performed by the number of workers during each increment of time during the business day, where at least one worker of the number of workers is assigned one of a number of schedules within one of a number of work windows, and where each of the number of work windows includes a core component and a flex component. The instructions further including functionality to obtain a forecasted demand distribution for an amount of work to be performed by the number of workers during each increment of time during the business day and to compare the scheduled worker distribution with the forecasted demand distribution for the business day. The instructions further including functionality to create a new schedule for one or more workers when the scheduled worker distribution and the forecasted demand distribution are not substantially equal, where the new schedule is within the work window associated with the worker. The instructions further including functionality to notify, a predetermined amount of time in advance of the business day, the worker of the new schedule.

In general, in one aspect, the invention relates to a system for scheduling workers in a business day. The system includes a data repository configured to send and receive a forecasted demand distribution and send and receive a scheduled worker distribution. The system further includes a scheduling system operatively connected to the data repository and configured to obtain the scheduled worker distribution specifying an amount of work to be performed by the number of workers during each increment of time during the business day, where at least one worker of the number of workers is assigned one of a number of schedules within one of a number of work windows, and where each of the number of work windows includes a core component and a flex component. The scheduling system is further configured to obtain the forecasted demand distribution for an amount of work to be performed by the number of workers during each increment of time during the business day and to compare the scheduled worker distribution with the forecasted demand distribution for the business day. The scheduling system is further configured to create a new schedule for one or more workers when the scheduled worker distribution and the forecasted demand distribution are not substantially equal, where the new schedule is within the work window associated with the worker. The scheduling system is further configured to notify, a predetermined amount of time in advance of the business day, the worker of the new schedule.

Other aspects of the invention will be apparent from the following description and the appended claims.

BRIEF DESCRIPTION OF DRAWINGS

FIG. 5 shows an example of a forecasted demand distribution in accordance with one or more embodiments of the invention.

DETAILED DESCRIPTION

Figure 1:
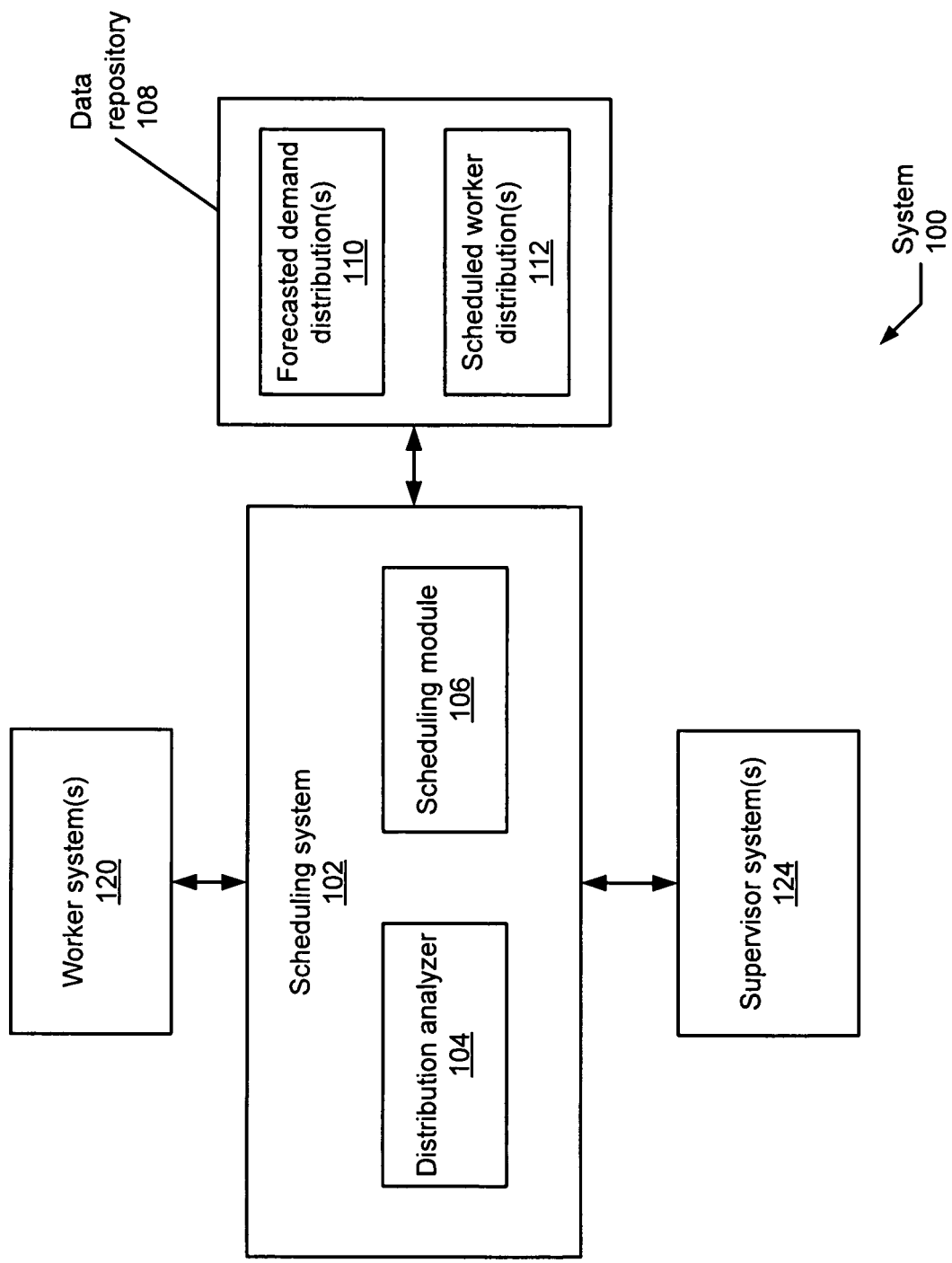
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scheduling workers. More specifically, one or more embodiments of the invention provide a method and system for scheduling a number of workers working different shifts to meet varying business demand, while also maintaining a consistent schedule for workers that can be adjusted in advance within a pre-determined work window. The concept of the work window and shifting a schedule within the work window is described in more detail in FIG. 2.

FIG. 1 shows a diagram of a system (100) in accordance with one or more embodiments of the invention. The system (100) includes a scheduling system (102) configured to interface with one or more worker systems (120), one or more supervisor systems (124), and a data repository (108). In addition, in one or more embodiments of the invention, the scheduling system (102) includes a distribution analyzer (104) and a scheduling module (106). In one or more embodiments of the invention, the worker system(s) (120) may include a web browser that provides access to features of the scheduling system (102). In one or more embodiments of the invention, the supervisor system(s) (124) may include a web browser that provides access to features of the scheduling system (102). Each of these components is described below. One of ordinary skill in the art will appreciate that embodiments of the invention are not limited to the configuration shown in FIG. 1.

In one or more embodiments of the invention, the supervisor system(s) (124) and the scheduling system (102) may be configured in any type of client/server architecture that enables users (e.g., supervisors, people responsible for setting work schedules) of the supervisor system(s) (124) to access network-enabled worker scheduling features. For example, in one or more embodiments of the invention, the scheduling system (102) is a web-based application and the supervisor system(s) (124) includes a web page displayed in a web browser. Alternatively, in one or more embodiments, the scheduling system (102) includes a distributable software component installed on each of the supervisor system(s) (124). For example, distributable worker scheduling software may be installed on each of the supervisor system(s) (124), and the distributable worker scheduling software may include one or more features configured to operate in communication with a network server. Such features may include, for example, online help, electronic entry, or any other type of network-enabled scheduling feature.

In one or more embodiments of the invention, the worker system(s) (120) and the scheduling system (102) may be configured in any type of client/server architecture that enables users of the worker system(s) to access network-enabled worker scheduling features. For example, in one or more embodiments of the invention, the scheduling system (102) is a web-based application and the worker system(s) (120) includes a web page displayed in a web browser. Alternatively, in one or more embodiments, the scheduling system (102) includes a distributable software component installed on each of the supervisor system(s) (120). For example, distributable worker scheduling software may be installed on each of the worker system(s) (120), and the distributable worker scheduling software may include one or more features configured to operate in communication with a network server. Such features may include, for example, online help, electronic entry, or any other type of network-enabled scheduling feature.

In one or more embodiments of the invention, the scheduling system (102) includes a distribution analyzer (104). In one or more embodiments of the invention, the distribution analyzer (104) is configured to compare the forecasted demand distribution(s) (110) and scheduled worker distribution(s) (112) (each described below). Through a supervisor system (124) communicating with the scheduling system (102), the user may establish one or more threshold parameters used by the distribution analyzer (104) to determine if the forecasted demand distribution(s) (110) and scheduled worker distribution(s) (112) are substantially similar. The user may set the threshold parameter(s) before the distribution analyzer (104) performs a comparison. The user may also alter threshold parameter(s) after a comparison has been performed, at which point a new comparison may be performed by the distribution analyzer (104) using the revised threshold parameter(s). Alternatively, the threshold parameter(s) used by the distribution analyzer (104) may be default settings.

The distribution analyzer (104) may be a server-side component of the scheduling system (102). Alternatively, the distribution analyzer (104) may be a third-party component (i.e., provided by a different entity than the worker system(s) (120), the supervisor system(s) (124), the scheduling module (106), and/or the scheduling system (102)) and communicatively coupled with the scheduling system (102)).

In one or more embodiments of the invention, the distribution analyzer (104) is also configured to shift a work schedule within the work window by an amount of time up to, and including, the flex component. Shifting a work schedule is described in more detail in FIG. 2 and may occur when the threshold parameter(s) has not been satisfied. If one or more work schedules is shifted, the schedule(s) is processed by the scheduling module (106) and integrated with the other work schedule(s) for the period of time being analyzed, the result of which is stored as a scheduled worker distribution (112). The distribution analyzer (104) may repeat this process until the threshold parameter(s) for the period of time being analyzed have been satisfied.

In one or more embodiments of the invention, the distribution analyzer (104) is configured to send results of the comparison to a supervisor system(s) (124). The results of the comparison may be presented in a number of different formats. For example, the results of the comparison may be presented as a graph, a table, an electronic spreadsheet, an email, or any other type of result that displays the comparison. Similarly, in one or more embodiments of the invention, the distribution analyzer (104) is configured to send results of the comparison to a worker system(s) (120). The results of the comparison may be presented in a number of different formats. For example, the results of the comparison may be presented as a graph, a table, an electronic spreadsheet, an email, or any other type of result that displays the comparison.

In one or more embodiments of the invention, the scheduling system (102) also includes a scheduling module (106). The scheduling module (106) is configured to integrate forecasted demand schedules and work windows for scheduled workers to create forecasted demand distribution(s) (110) and scheduled worker distribution(s) (112), respectively, which are stored in the data repository (108), described below. In one or more embodiments of the invention, the scheduling module (106) receives instructions from the distribution analyzer (104) as to which worker(s) has a schedule shift, and where within the work window for each worker the schedule is shifted, to satisfy the threshold parameter(s). The scheduling module (106) may also repeat this process upon a prompt from the distribution analyzer (104), as described above. The scheduling module (106) may be a server-side component of the scheduling system (102). Alternatively, the scheduling module (106) may be a third-party component (i.e., provided by a different entity than the worker system(s) (120), the supervisor system(s) (124), the distribution analyzer (104), and/or the scheduling system (102)) and communicatively coupled with the scheduling system (102)).

In one or more embodiments of the invention, the data repository (108) includes a forecasted demand distribution(s) (110) and a scheduled worker distribution(s) (112). In one or more embodiments of the invention, the forecasted demand distribution(s) (110) is configured to store forecasted demand for an increment of time. The forecasted demand distribution (s) (110) may specify an amount of work that needs to be performed, broken down by each increment of time during a business day. The increment of time used in each forecasted demand distribution (110) may be determined by the user, by default settings, or some combination thereof. As discussed above, in one or more embodiments of the invention, the scheduling module (106) processes forecasted demand schedule(s) for a business day and integrates them to create one or more forecasted demand distributions (110) for that business day.

The forecasted demand schedule(s) may be obtained from many different sources, or combinations thereof. For example, the forecasted demand schedule(s) may be obtained from a scheduling application, an electronic spreadsheet, a project management application, a supervisor, a user, or any other type of source that provides forecasted demand schedule(s). In addition, the forecasted demand distribution(s) (110) may appear in a number of different formats, or combinations thereof. For example, the forecasted demand distribution(s) (110) may appear as a graph, a table, text, or any other type of format that communicates a forecasted demand distribution(s) (110).

In one or more embodiments of the invention, the scheduled worker distribution(s) (112) is configured to store an aggregation of work schedules for an increment of time. The scheduled worker distribution(s) (112) may specify an amount of work expected to be performed by the scheduled workers by a number of workers scheduled to work during the business day. The scheduled worker distribution(s) (112) may also be broken down by an increment of time during a business day. The increment of time used in each scheduled worker distribution (112) may be determined by the user, by default settings, or some combination thereof. In one or more embodiments of the invention, the amount of work that a worker performs in an increment of time varies with the experience or employment level of the worker. As discussed below, in one or more embodiments of the invention, the scheduling module (106) processes work windows for scheduled workers for a business day and integrates them to create one or more scheduled worker distribution (112) for that business day.

The work window for each scheduled worker may be obtained from many different sources, or combinations thereof. For example, the work window for each scheduled worker may be obtained from a scheduling application, an electronic spreadsheet, a project management application, a supervisor, a user, or any other type of source that provides work window(s) for each scheduled worker that can be manipulated into a scheduled worker distribution(s) (112). In one or more embodiments of the invention, the core component and flex component(s) are part of the work window (as discussed in FIG. 2) for the scheduled worker. In addition, the scheduled worker distribution(s) (112) may appear in a number of different formats, or combinations thereof. For example, the scheduled worker distribution(s) (112) may appear as a graph, a table, text, or any other type of format that communicates a scheduled worker distribution(s) (112).

Figure 2:
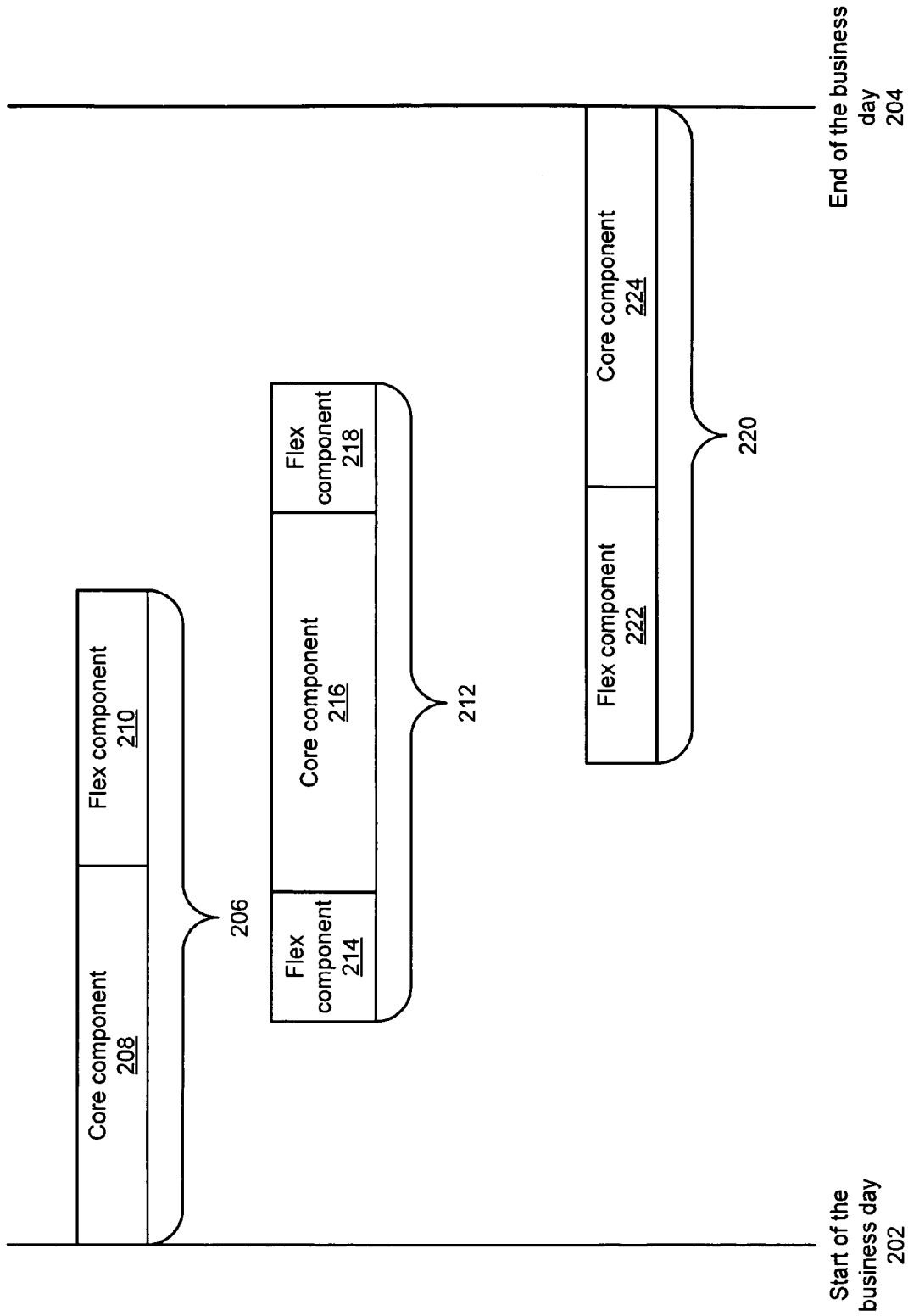
FIG. 2 shows a schematic diagram of various work windows in accordance with one or more embodiments of the invention.

Referring to FIG. 2, several examples of a work window in a business day are shown. For each example, the business day is shown in a timeline format, with the start of the business day (202) on the left and the end of the business day (204) on the right. As explained more fully below, each work window includes a core component and a flex component. In one or more embodiments of the invention, the core component and the flex component(s) in a business day are contiguous. In one or more embodiments of the invention, the schedule for the worker may be within the work window. Further, the core component may be the default schedule for the worker. In one or more embodiments of the invention, the duration of the core component may be equal to the duration of the work schedule for the worker on that business day. In addition, the duration of the flex component may be equal to an amount of time that the core component of the worker may be shifted for a business day. For example, if the core component represents a schedule from 8:00 a.m. until 5:00 p.m., and if the flex component is two hours after the core component, then the core component may be shifted, creating a new schedule from 10:00 a.m. until 7:00 p.m. In one or more embodiments of the invention, the duration of the flex component for each worker may be equal, regardless of whether the flex component occurs in one portion or in multiple portions for that worker in that business day.

In one or more embodiments of the invention, the position of the flex component may indicate the direction that the core component of the worker may be shifted. For example, if the flex component only comes after the core component during a business day, then the core component may only be shifted to a later time and not an earlier time. In one or more embodiments of the invention, the core component may be shifted for any amount of time within the work window. If the core component represents a schedule from 8:00 a.m. until 5:00 p.m., and if the flex component is two hours after the core component, then the core component may be shifted by a portion of the duration of the flex component, creating a new schedule from 8:23 a.m. until 5:23 p.m. Alternatively, the core component may be shifted by the entire duration of the flex component, creating a new schedule from 10:00 a.m. until 7:00 p.m. Alternatively, in one or more embodiments of the invention, the flex component may be broken down into an increment of time, such as a whole hour, a half hour, a minute, or any other increment of time.

In one or more embodiments of the invention, the flex component may be added to the core component. In other words, rather than shifting the core component within the work window, the flex component is added to the core component. For example, if the core component represents a schedule from 8:00 a.m. until 5:00 p.m., and if the flex component is two hours after the core component, then the core component may be extended such that the duration is now 8:00 a.m. until 7:00 p.m. Alternatively, for instances when a portion of the flex component may be used, the core component may be shifted, for example, to create a new schedule from 8:00 a.m. until 6:30 p.m.

Returning to FIG. 2, in the first example of a work window (206), the start of the core component (208) coincides with the start of the business day (202). In one or more embodiments of the invention, there is only one flex component (210), and it begins when the core component (208) ends during the business day. In this first example of a work window (206), the core component (208) of the worker may only be shifted backward in time. In other words, this worker knows that, on this business day, his work window does not exceed the core component and the flex component. For example, the start of the business day (202) may be 6:00 a.m. If the core component for a worker is from 6:00 a.m. until 3:00 p.m. and if the flex component is one hour, the worker knows that his schedule for that business day does not begin prior to 6:00 a.m. and does not extend beyond 4:00 p.m.

In the second example of a work window (212), the flex component is split into two parts. In one or more embodiments of the invention, the first flex component (214) ends before the start of the core component (216), and the second flex component (218) begins after end of the core component (216). Put another way, as in this example, the start of the core component (216) starts at an amount of time, not to exceed the duration of the first flex component (214), after the start of the business day (202). Likewise, the end of the core component (216) ends an amount of time, not to exceed the duration of the second flex component (218), before the end of the business day (204). In one or more embodiments of the invention, the duration of the first flex component (214) equals the duration of the second flex component (216). For example, the start of the business day may be 6:00 a.m., and the end of the business day may be 9:00 p.m. The core component (216) for a worker is from 10:00 a.m. until 4:00 p.m., and the first flex component (214) and the second flex component (218) are each one hour in duration. In this case, the worker knows that his schedule for that business day does not begin prior to 9:00 a.m. and does not extend beyond 5:00 p.m.

In the third example of a work window (220), the end of the core component (224) coincides with the end of the business day (204). In one or more embodiments of the invention, there is only one flex component (222), and it ends when the core component (224) begins during the business day. In one or more embodiments of the invention, in this example of a work window (220), the core component (224) of the worker may only be shifted forward in time. In other words, this worker knows that, on this business day, his work window does not exceed the core component and the flex component. For example, the end of the business day (204) may be 10:00 p.m. If the core component for a worker is from 3:00 p.m. until 10:00 p.m. and if the flex component is one hour, the worker knows that his schedule for that business day does not begin prior to 2:00 p.m. and does not extend beyond 10:00 p.m.

Figure 3:
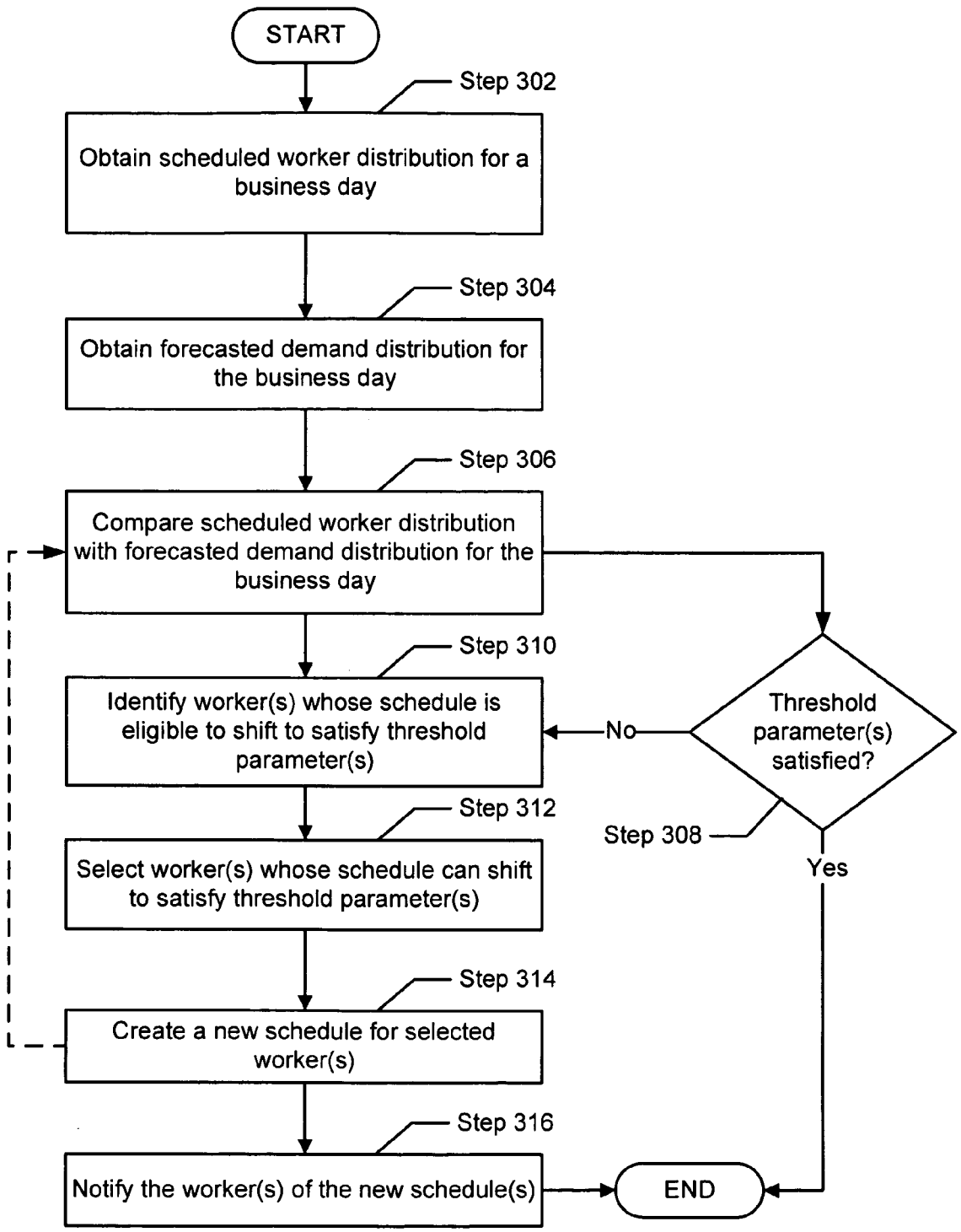
FIG. 3 shows a flowchart for scheduling workers in accordance with one or more embodiments of the invention.

FIG. 3 shows a flowchart of a method for scheduling workers in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that other steps, omitted in FIG. 3, may be included in this flowchart. Accordingly, the specific arrangement of steps shown in FIG. 3 should not be construed as limiting the scope of the invention.

In Step 302, the scheduled worker distribution for a business day is obtained. In one or more embodiments, any increment of time may be used, such as a business week or a business month. The increment of time to be used may be defined by the user. As described above, the scheduled worker distribution is an aggregation of work windows for each worker for the increment of time. In one or more embodiments of the invention, the format of the scheduled worker distribution is chosen by the user.

In Step 304, the forecasted demand distribution for a business day is obtained. In one or more embodiments, any increment of time may be used, such as a business week or a business month. The increment of time to be used may be defined by the user. In one or more embodiments of the invention, the format of the forecasted demand distribution is chosen by the user.

In Step 306, the scheduled worker distribution is compared with the forecasted demand distribution for the business day. In one or more embodiments of the invention, the format of the results of the comparison is determined and/or altered by a user. For example, the user may request that the results of the comparison be presented as an electronic spreadsheet and that the comparison is shown in half-hour time increments. Alternatively, the format of the results of the comparison may be determined by default settings regarding the format and increments of time. For example, the default settings for the results of the comparison may be a graph broken out in four hour increments during a business day.

In Step 308, a determination then needs to be made as to whether threshold parameter(s) have been satisfied in balancing the forecasted demand distribution and the scheduled worker distribution. If the threshold parameter(s) have not been satisfied, then the process proceeds to Step 310. If the threshold parameter(s) have been satisfied, then the process ends. Parameters to determine the threshold may be entered into the scheduling system before the comparison begins. The threshold parameters may also be default settings within the scheduling system. Alternatively, or the threshold parameters in the scheduling system may be altered by the user after the comparison has been performed, at which time another comparison may be performed using the revised threshold parameters. For example, the results of a comparison of the forecasted demand distribution and the scheduled worker distribution may lead the user to decide that the threshold parameters should be modified from requiring that no increment of time in the comparison is deficient by more than one worker to requiring that no increment of time in the comparison is deficient by more than three workers. As discussed above, the comparison may be delivered to the user in a variety of digital formats, including but not limited to email, text message, web page, display on a monitor, and spreadsheet file.

In Step 310, the worker(s) whose schedule may be shifted to satisfy the threshold parameter(s) is identified. Identification of the worker(s) is part of the comparison performed by the scheduling system in adjusting work schedules within each work window to satisfy the threshold parameter(s).

In Step 312, the worker(s) whose schedule may be shifted to satisfy the threshold parameter(s) is selected. In one or more embodiment, if the number of workers whose schedule may be shifted to satisfy the threshold parameter(s) exceeds the number of workers whose schedule actually needs to be shifted to satisfy the threshold parameter(s), then the user may choose the worker(s) whose schedule is to be shifted. Alternatively, there may be a rule set in place to determine how the selection is to be made. For example, a rule set may dictate that the schedule of workers with the lower seniority are shifted before the schedule of workers with higher seniority. The rule set in this case may be entered into the scheduling system, and the selection of the worker(s) is based on the rule set. Alternatively, a rule set may be based on a default setting.

Continuing with Step 312, alternatively, there may be a bidding system where a list of workers whose schedule may be shifted to satisfy the threshold parameter(s) is posted in advance, and volunteer(s) from among the list are taken until the threshold parameter(s) is satisfied. The names of the volunteer(s) are entered into the scheduling system, which shifts the work schedule for each volunteer. Alternatively, a hybrid system may exist, for example where the bidding system is used for a period of time, and if the schedule of additional worker(s) from among the list needs to be shifted to satisfy the threshold parameter(s), then a rule set is followed (e.g., the user makes the selection(s) or the selection(s) are based on seniority).

In Step 314, a new schedule for a worker is created by the scheduling system. In one or more embodiments of the invention, the purpose of creating a new schedule for a worker is to satisfy the threshold parameter(s) when comparing the difference between the scheduled worker distribution and the forecasted demand distribution. The new schedule may occur within the work window for the worker. In one or more embodiments of the invention, a new schedule is to be created for a number of workers for a business day. Further, if a new schedule is created for a number of workers in a business day, the work window for each of those workers may occur at the same times during the business day or at different times during the business day.

Continuing with Step 314, the new schedule may be created by shifting the core component by an amount of time not to exceed the flex component. In addition, in one or more embodiments of the invention, the new schedule may be created by adding some or all of the flex component to the core component. In addition, in one or more embodiments of the invention, the new schedule that is created may be maintained for a contiguous period of time. For example, the normal schedule for a worker is normally 8:00 a.m. until 2:00 p.m. on Tuesday with a flex component of one hour on either side of the schedule. If the user creates a new schedule from 9:00 a.m. until 3:00 p.m. on Tuesday for the worker, the user may maintain that new schedule for every Tuesday for the entire month, for the next six Tuesdays, or for some other contiguous period of time.

Optionally, in one or more embodiments of the invention, Steps 306-312 may be repeated for the same increment of time before proceeding to Step 316. For example, a user may want to run some "what if" scenarios to compare various schedules to determine the optimal scenario in meeting customer demand. In addition, in one or more embodiments of the invention, Steps 306-312 may be repeated for the same increment of time or for a different increment of time before proceeding to Step 316. Different increments of time may be analyzed as part of a broader scheduling period. For example, work schedules may be established for a single business day before repeating the process for other business days in the same week in order to establish a work schedule for an entire work week.

In Step 316, each worker with a new schedule is notified about the new schedule. The notification may be made in a variety of different ways, through a variety of different sources, or combinations thereof. For example, after the user and/or worker(s) receives the results of the comparison performed by the scheduling system, the notification may be made in a face-to-face conversation, in a conversation by telephone, by email, by text message, by posting on a bulletin board, by mail through the postal service, or any other type of method and/or source that provides the notification to the worker. While the scheduling system is integral to the notification process, the user is not. In other words, the scheduling system may notify each worker directly (e.g., by email, by text message, by automated phone call, etc.) in addition to notifying the user. In one or more embodiments of the invention, the workers are notified of the new schedule in advance of the start of the business day.

Figure 4:
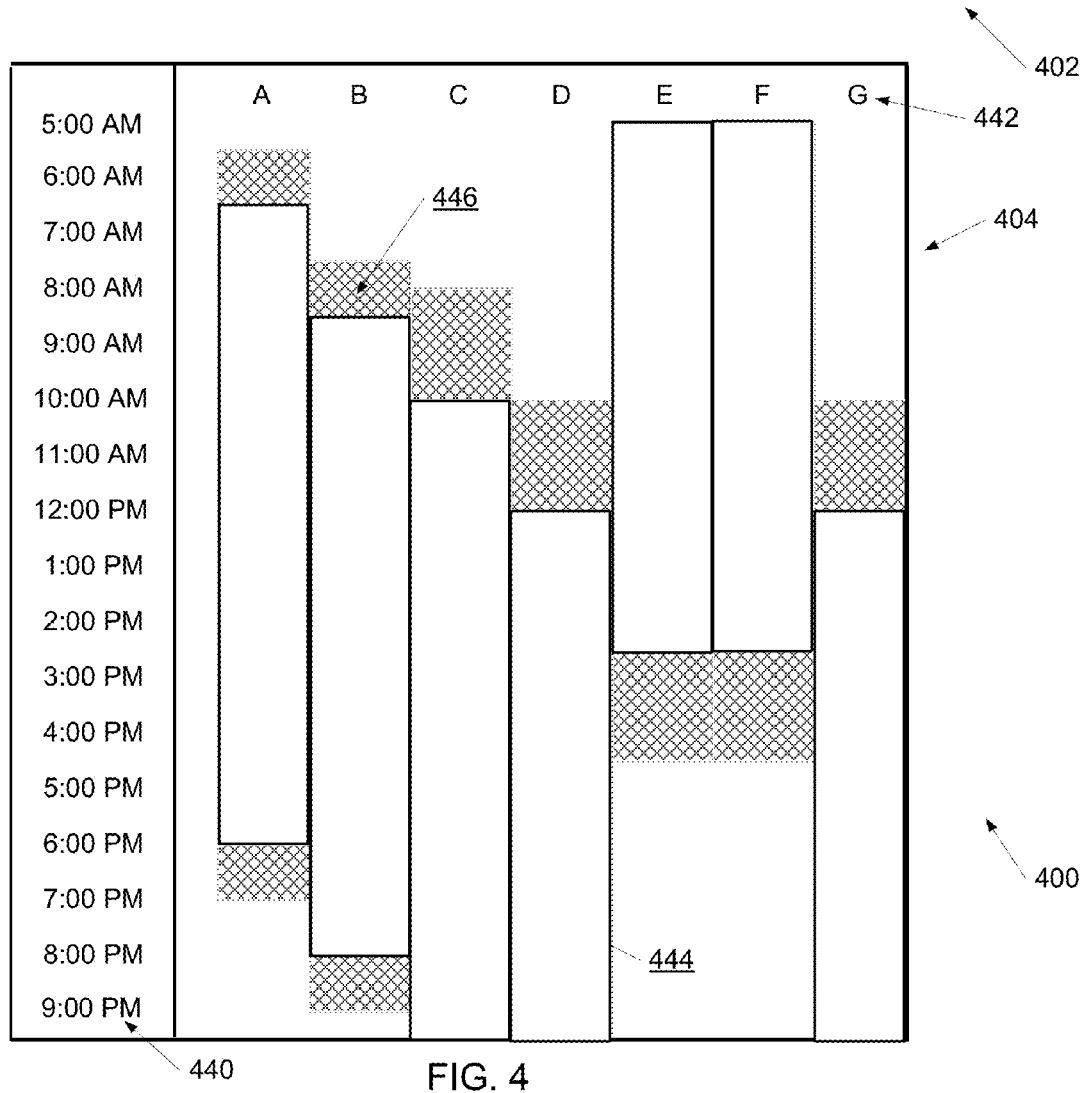
FIG. 4 shows an example of a work schedule for a number of workers in accordance with one or more embodiments of the invention.

FIGS. 4 and 5 show examples in accordance with one or more embodiments of the invention. The examples are not intended to limit the scope of the invention.

FIG. 4 shows an example of a work schedule (400) for a number of workers in accordance with one or more embodiments of the invention. The work schedule in this example shows a work window for each of seven workers (worker A through worker G) and is displayed in both tabular format (402) and graphical format (404). The data in the tabular format (402) of this example corresponds to the information in the graphical format (404). Work schedules such as those shown in FIG. 4 may be input into the scheduling system, integrated and processed by the scheduling module, and stored as a scheduled worker distribution. In addition, in one or more embodiments of the invention, the distribution analyzer compares the scheduled worker distribution with a forecasted demand distribution and adjusts the core component of each worker within the flex component for that worker in an attempt to satisfy the threshold parameter(s) to achieve an optimal set of work schedules.

The tabular format (402) of the work schedule (400) for the example shown in FIG. 4 includes the following columns: (i) worker; (ii) day of the week; (iii) core component, which includes a start time and stop time; and (iv) flex component (s), which includes a start time and stop time for the first part of the flex component and a start time and stop time for the second part of the flex component, if applicable. In this example, the work window for a worker equals the core component (444) and the flex component(s) (446) for that worker.

The graphical format (404) of the work schedule (400) for the example shown in FIG. 4 includes a vertical axis (440) corresponding to time and a horizontal axis (442) corresponding to individual workers. The graphical format (404) of this example includes a block of time for each worker showing the core component (444) and the flex component(s) (446), where the flex component(s) (446) are shown in cross-hatch. The information in the graphical format (404) of this example shows the core component (444) and the flex component(s) (446) corresponding to each worker on Monday.

FIG. 5 shows an example of a forecasted demand distribution (500) in accordance with one or more embodiments of the invention. The forecasted demand distribution (500) of FIG. 5 is shown in tabular form and has a vertical axis (502) in terms of time in a business day, shown in half-hour increments, and a horizontal axis (504) in terms of weeks. While this example shows average demand for each increment of time during the course of a week, other increments of time may be shown on the horizontal axis (504), including but not limited to days in a week or months.

In general, embodiments of the invention may give one or more users an ability to adjust a work schedule up to an amount of time before the business day, as previously agreed between the worker and supervisor. In one or more embodiments of the invention, the worker may work a constant number of hours per week, even if the worker has one or more new schedules in a week. In one or more embodiments of the invention, the worker maintains the same days of the week off the schedule, even if the worker has one or more new schedules in a week.

Figure 6:
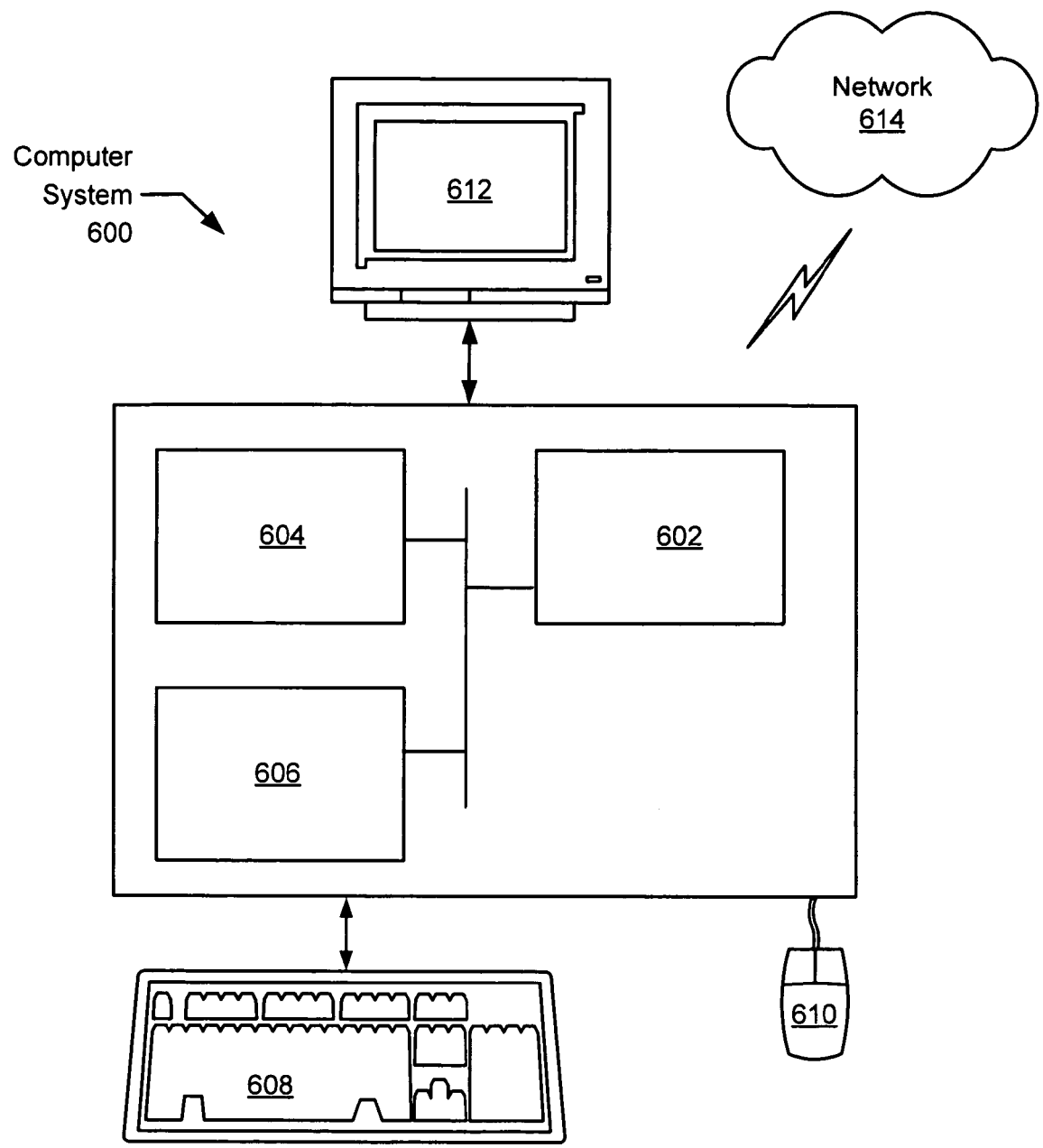
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., application data storage, aggregation engine, data analysis engine, rules engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scheduling a plurality of workers in a business day, comprising:
    obtaining a scheduled worker distribution comprising a plurality of work windows and specifying an original amount of work to be performed by the plurality of workers during the business day, wherein each of the plurality of work windows comprises a core component and a flex component, and wherein the flex component represents a maximum amount of time, adjacent to the core component, by which schedules in the core component may be shifted;
    identifying, for a worker of the plurality of workers, a schedule within the core component of a work window of the plurality of work windows;
    notifying the worker of the schedule and the flex component of the work window;
    obtaining, after notifying the worker of the schedule and the flex component, a forecasted demand distribution specifying an updated amount of work to be performed by the plurality of workers during the business day;
    generating, by a computer processor, a comparison of the scheduled worker distribution with the forecasted demand distribution for the business day, wherein the comparison takes as an input a threshold parameter specifying a tolerable number of deficient workers for each increment of time in the comparison, wherein the scheduled worker distribution and the forecasted demand distribution are not equal;
    creating, by the computer processor and based on the comparison, a new schedule for the worker by shifting the schedule into the flex component of the work window while leaving the core component of the new schedule unchanged, wherein the new schedule satisfies the updated amount of work; and
    notifying, in advance of the business day, the worker of the new schedule.

2. The method of claim 1, further comprising:
    maintaining the new schedule for the worker for a contiguous period of time.

3. The method of claim 1, wherein the difference between the scheduled worker distribution and the forecasted demand distribution decreases after the new schedule is created.

4. The method of claim 1, wherein the flex component comprises one selected from a group consisting of:
    an amount of time after the core component when the worker begins a schedule at the start of the business day;
    an amount of time before the core component when the worker finishes the schedule at the end of the business day; and
    a first amount of time before the core component and a second amount of time after the core component when the worker begins the schedule after the start of the business day and ends the schedule before the end of the business day.

5. The method of claim 1, wherein the schedule comprises a duration for the worker that is equal to a duration of the core component for the worker during the business day.

6. The method of claim 1, wherein creating the new schedule comprises shifting each of the plurality of schedules by an amount of time that does not exceed the flex component.

7. The method of claim 1, wherein the flex component for each of the plurality of work windows comprises a duration that is equal.

8. The method of claim 1, wherein the worker is scheduled to work a constant number of hours per week.

9. A non-transitory computer readable medium storing instructions for scheduling a plurality of workers in a business day, the instructions, upon execution by a computer system, causing the computer system to perform a method comprising:
    obtaining a scheduled worker distribution comprising a plurality of work windows and specifying an original amount of work to be performed by the plurality of workers during the business day, wherein each of the plurality of work windows comprises a core component and a flex component, and wherein the flex component represents a maximum amount of time, adjacent to the core component, by which schedules in the core component may be shifted;
    identifying, for a worker of the plurality of workers, a schedule within the core component of a work window of the plurality of work windows;
    notifying the worker of the schedule and the flex component of the work window;
    obtaining, after notifying the worker of the schedule and the flex component, a forecasted demand distribution specifying an updated amount of work to be performed by the plurality of workers during the business day;

generating a comparison of the scheduled worker distribution with the forecasted demand distribution for the business day, wherein the comparison takes as an input a threshold parameter specifying a tolerable number of deficient workers for each increment of time in the comparison, wherein the scheduled worker distribution and the forecasted demand distribution are not equal;

creating, based on the comparison, a new schedule for the worker by shifting the schedule into the flex component of the work window while leaving the core component of the new schedule unchanged, wherein the new schedule satisfies the updated amount of work; and notifying, in advance of the business day, the worker of the new schedule.

10. The non-transitory computer readable medium of claim 9, the instructions further comprising functionality to:

maintain the new schedule for the worker for a contiguous period of time.

11. The non-transitory computer readable medium of claim 9, wherein the difference between the scheduled worker distribution and the forecasted demand distribution decreases after the new schedule is created.

12. The non-transitory computer readable medium of claim 9, wherein the flex component comprises one selected from a group consisting of:

an amount of time after the core component when the worker begins a schedule at the start of the business day;

an amount of time before the core component when the worker finishes a schedule at the end of the business day; and a first amount of time before the core component and a second amount of time after the core component when the worker begins a schedule after the start of the business day and ends a schedule before the end of the business day.

13. The non-transitory computer readable medium of claim 9, wherein the schedule comprises a duration for the worker that is equal to a duration of the core component for the worker during the business day.

14. The non-transitory computer readable medium of claim 9, wherein creating the new schedule comprises shifting each of the plurality of schedules by an amount of time that does not exceed the flex component.

15. The non-transitory computer readable medium of claim 9, wherein the flex component for each of the plurality of work windows comprises a duration that is equal.

16. The non-transitory computer readable medium of claim 9, wherein the worker is scheduled to work a constant number of hours per week.

17. A system for scheduling workers in a business day, comprising:

a computer processor;

a data repository configured to:
send and receive a forecasted demand distribution; and
send and receive a scheduled worker distribution; and a scheduling system executing on the computer processor, operatively connected to the data repository, and configured to:

obtain the scheduled worker distribution comprising a plurality of work windows and specifying an original amount of work to be performed by a plurality of workers during the business day, wherein each of the plurality of work windows comprises a core component and a flex component, and wherein the flex component represents a maximum amount of time, adjacent to the core component, by which that schedules in the core component may be shifted;

identify, for a worker of the plurality of workers, a schedule within the core component of a work window of the plurality of work windows;

notify the worker of the schedule and the flex component of the work window;

obtain, after notifying the worker of the schedule and the flex component, the forecasted demand distribution specifying an updated amount of work to be performed by the plurality of workers during the business day;

generate a comparison of the scheduled worker distribution with the forecasted demand distribution for the business day, wherein the comparison takes as an input a threshold parameter specifying a tolerable number of deficient workers for each increment of time in the comparison, wherein the scheduled worker distribution and the forecasted demand distribution are not equal;

create, based on the comparison, a new schedule for the worker by shifting the schedule into the flex component of the work window while leaving the core component of the new schedule unchanged, wherein the new schedule satisfies the updated amount of work; and notify, in advance of the business day, the worker of the new schedule.

18. The system of claim 17, wherein the scheduling system is further configured to:

maintain the new schedule for the worker for a contiguous period of time.

19. The system of claim 17, wherein the schedule comprises a duration for the worker that is equal to a duration of the core component for the worker during the business day.

20. The system of claim 17, wherein the worker is scheduled to work a constant number of hours per week.

* * * * *